No. 799,849. PATENTED SEPT. 19, 1905.
O. L. HENERLAU.
SNAP CATCH FOR NECKLACES, &c.
APPLICATION FILED APR. 5, 1905.
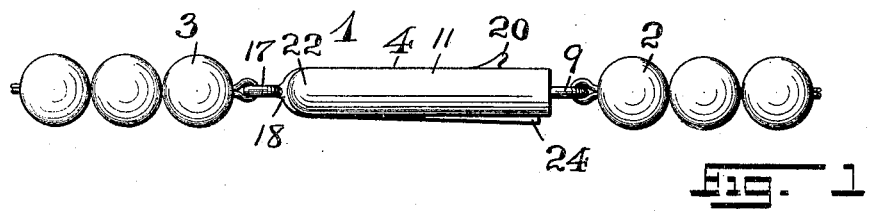
Fig. 1.
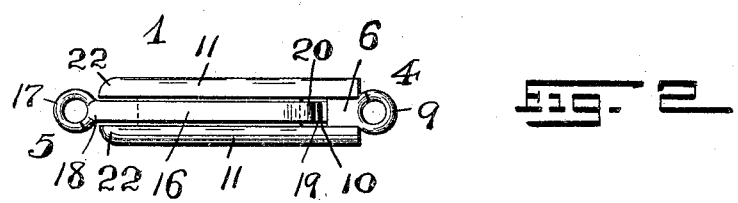
Fig. 2.
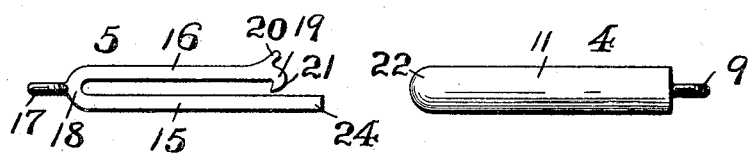
Fig. 3.
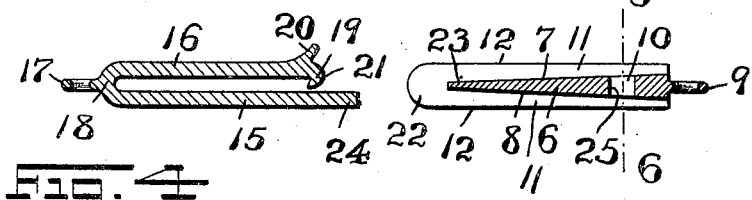
Fig. 4.
Fig. 5.
Fig. 6.
Fig. 7.
WITNESSES
Geo. D. Richards
F. H. W. Fraentzel
INVENTOR:
Otto L. Henerlau,
BY
Fred C. Fraentzel,
ATTORNEY

UNITED STATES PATENT OFFICE.

OTTO L. HENERLAU, OF NEWARK, NEW JERSEY.

SNAP-CATCH FOR NECKLACES, &c.

No. 799,849. Specification of Letters Patent. Patented Sept. 19, 1905.

Application filed April 5, 1905. Serial No. 254,001.

*To all whom it may concern:*

Be it known that I, OTTO L. HENERLAU, a citizen of the United States, residing at Newark, in the county of Essex and State of New Jersey, have invented certain new and useful Improvements in Snap-Catches for Necklaces, &c.; and I do hereby declare the following to be a full, clear, and exact description of the invention, such as will enable others skilled in the art to which it appertains to make and use the same, reference being had to the accompanying drawings, and to numerals of reference marked thereon, which form a part of this specification.

This invention has reference generally to improvements in snap-catches for necklaces, bracelets, and other articles of manufacture of a similar character; and the invention relates more particularly to a novel construction of snap-catch comprising a pair of holding members, the same being of such arrangement and construction that the snap member will embrace the outer and opposite faces of the main holding member instead of being inserted in a hollow or tubular holding member.

The invention has for its principal objects to provide a simple, strong, and neatly-constructed device in the form of a snap-catch for necklaces and the like the members of which can be brought into separable holding engagement by having a snap member or clasp forced over the outside of the main holding member and having a hook-shaped holding portion spring into a receiving portion of the said main holding member.

A further object of this invention is to provide a snap-catch comprising a pair of body members, one of which is a snap member or clasp consisting of a pair of connected spring-arms adapted to be slipped over a receiving portion of the main holding member between a pair of guides connected with said receiving or holding member, all arranged that the parts can be easily and operatively connected and are not liable to separation by accidental contact with a foreign object to release the catch, and thus separate the two members of the article of manufacture when such separation of the parts is not desired.

Other objects of this invention not at this time more particularly mentioned will be clearly evident from the following detailed description of the same.

With the various objects of the invention in view the said invention consists, primarily, in the novel snap-catch for necklaces, bracelets, and the like, hereinafter more fully set forth; and, furthermore, this invention consists in the arrangements and combinations of the various devices and parts hereinafter more fully described and then finally embodied in the clauses of the claim, which are appended to and which form an essential part of this specification.

The invention is clearly illustrated in the accompanying drawings, in which—

Figure 1 is a side face view of a snap-catch and end portions of a necklace connected by the same, the said snap-catch embodying the principles of this invention; and Fig. 2 is a top edge view of the same. Fig. 3 is a side face view of the two members of the snap-catch in their separated relation, and Fig. 4 is a central longitudinal section of the same. Fig. 5 is a longitudinal vertical section of the said members of the snap-catch in their assembled relation. Fig. 6 is a transverse section of the main holding member, said section being taken on line 6 6 in said Fig. 4; and Fig. 7 is a similar section of a slightly-modified form of the main holding member.

Similar characters of reference are employed in the above-described views to indicate corresponding parts.

Referring now to the several figures of the drawings, the reference character 1 indicates the complete snap-catch, and 2 and 3 the respective end portions of a necklace. The said snap-catch 1 comprises a main holding member 4 and a snap member or clasp 5, substantially as illustrated in the several figures of the drawings. The said main holding member 4 consists, essentially, of a central plate-like body 6, the opposite sides 7 and 8 of which taper in a manner clearly shown in Figs. 4 and 5, the said body 6 being provided at its one end with a suitable loop or eye 9, to which may be attached the end portion 2 of the necklace, as represented in Fig. 1 of the drawings. The said tapering or wedge-shaped body 6 is also provided at any desirable point with a receiving-opening 10. The said body 6 is also made with longitudinally-extending side pieces or members 11, which have their marginal edge portions 12 extending respectively above and below the opposite faces of the said body 6, so as to provide suitable guides upon the opposite sides of the body 6, as will be clearly understood from an inspection of Figs. 2, 4, 5, 6, and 7 of the drawings. The outer faces of the said side pieces or members 11 may be made convex, as at 13, and as shown more particularly in Fig. 6, or said side pieces may be made with the straight faces 14, as clearly indicated in Fig. 7 of the drawings.

The snap member or clasp 5 consists, essentially, of a pair of clasping or grasping fingers 15 and 16, connected, as at 18, and provided with an eye or loop 17, to which may be attached the end portion 3 of the necklace. The said fingers 15 and 16 and their connecting portions 18 are made from spring metal, and the normal tendency of said fingers is to spring or draw toward each other at their free ends. One of said fingers, as 15, is preferably made longer than the finger 16, the finger 16 having at its free end a holding or engaging hook or portion 19, and an upwardly-extending lug or stud 20, forming with the outer rounded part 21 of said hook or portion 19 a notch for the reception of the edge of the thumb or finger nail for lifting purposes to separate the snap member from its clasped or holding engagement with the main holding body, as will be presently described.

As shown in Fig. 4 of the drawings, the ends 22 of the two side pieces or members 11 of the wedge-shaped body 6 project beyond the thinnest part 23 of the said body 6. To connect the two members 4 and 5, the end portion 24 of the longer finger 15 of the snap member or clasp is easily inserted in the receiving-space formed by the two projecting ends 22 of the side pieces or members 11 and arranged against one of the inclined faces of the body 6. The two members 5 and 6 are then pushed together, so that the fingers 15 and 16 will move upon the opposite faces of the body 6 and owing to the inclination of the said faces will be forced outwardly and produce a firm clasping or grasping action of the member 5 with the outer faces of the body 6 of the member 4. When the hook or portion 19 of the finger 15 reaches the receiving-opening 10 in the body 6, the hook or portion 19 snaps into said opening 10 and engages an edge 25 of said opening, as clearly illustrated in Fig. 5 of the drawings. In this manner the two members 4 and 5 are firmly held in their clasped relation, as shown.

The two members 4 and 5 are readily separated, by means of the thumb or finger nail, when exerting a slight upward pressure upon the lug or stud 20 of the finger 16, whereby the hook or portion 19 is raised from the opening 10 in the body 6, and the two members 4 and 5 are forced apart, as will be clearly understood.

From the foregoing description of my invention it will be clearly seen that I have devised a simple, neat, strong, and ornamental snap-catch for use with the end portions of a necklace, bracelet, and other similar article of manufacture in which the parts of the snap member or clasp embrace the outer faces of the main holding member, thereby providing a device in which the operative parts have been reduced to a minimum and in which the two engaging members of the snap-catch are readily brought into their connected holding or locked relation and from which said parts or members can readily be separated.

Having thus described my invention, what I claim is—

1. As an article of manufacture, a snap-catch for a necklace, bracelet, and the like, comprising a main body member having oppositely-tapering sides forming a wedge-shaped body, said body member having longitudinally-extending guides projecting from the opposite tapering faces of said wedge-shaped body member, and a snap member or clasp, said snap member or clasp having holding portions adapted to be arranged on opposite sides of said wedge-shaped body and between the guides thereof, and brought in holding engagement with said body, substantially as and for the purposes set forth.

2. As an article of manufacture, a snap-catch for a necklace, bracelet, and the like, comprising a main body member having oppositely-tapering sides forming a wedge-shaped body, said body being provided with a holding-device-receiving means, longitudinal guides upon the marginal edges of said wedge-shaped body, said guides projecting from the opposite tapering faces of said wedge-shaped body member, and a snap member or clasp, said snap member or clasp having holding portions adapted to be arranged upon the opposite sides and between the guides of said wedge-shaped body, and means on one of said holding portions adapted to be brought in holding engagement with said holding-device-receiving means of said main body, substantially as and for the purposes set forth.

3. As an article of manufacture, a snap-catch for a necklace, bracelet, and the like, comprising a main body member having oppositely-tapering sides forming a wedge-shaped body, said body being provided with a receiving-opening, and a snap member or clasp consisting of a pair of connected spring-fingers, adapted to be arranged upon opposite sides of said wedge-shaped body, a holding-hook on one of said fingers adapted to be sprung into holding engagement with said receiving-opening in said wedge-shaped body, and a lifting lug or stud on the spring-finger which is provided with said holding-hook, substantially as and for the purposes set forth.

4. As an article of manufacture, a snap-catch for a necklace, bracelet, and the like, comprising a main body member having oppositely-tapering sides forming a wedge-shaped body, said body being provided with a receiving-opening, longitudinal guides upon the marginal edges of said wedge-shaped body, said guides projecting from the opposite tapering faces of said wedge-shaped body member, and a snap member or clasp consisting of a pair of connected spring-fingers, adapted to be arranged upon opposite sides and between the guides of said wedge-shaped body, and a holding-hook on one of said fingers adapted to be sprung into holding engagement with said receiving-opening in said wedge-shaped body, substantially as and for the purposes set forth.

5. As an article of manufacture, a snap-catch for a necklace, bracelet, and the like, comprising a main body member having oppositely-tapering sides forming a wedge-shaped body, said body being provided with a receiving-opening, longitudinal guides upon the marginal edges of said wedge-shaped body, said guides having end portions extending beyond the thinnest portion of said wedge-shaped body, and a snap member or clasp consisting of a pair of connected spring-fingers, one of said fingers being longer than the other finger, said spring-fingers being adapted to be arranged upon opposite sides and between the guides of said wedge-shaped body, a holding-hook on the shorter of said spring-fingers adapted to be sprung into holding engagement with said receiving-opening in said wedge-shaped body, and a finger-piece on said short spring-finger, substantially as and for the purposes set forth.

In testimony that I claim the invention set forth above I have hereunto set my hand this 1st day of April, 1905.

OTTO L. HENERLAU.

Witnesses:
FREDK. C. FRAENTZEL,
GEO. D. RICHARDS.